(12) United States Patent
Kraynov (10) Patent No.: US 12,062,889 B2
(45) Date of Patent: Aug. 13, 2024

(54) METHOD AND DEVICE FOR MONITORING SWITCHGEARS

(71) Applicant: Schneider Electric Industries SAS, Rueil Malmaison (FR)

(72) Inventor: Vladislav Kraynov, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 232 days.

(21) Appl. No.: 17/742,476

(22) Filed: May 12, 2022

(65) Prior Publication Data

US 2022/0376481 A1 Nov. 24, 2022

(30) Foreign Application Priority Data

May 21, 2021 (FR) .................................. FR2105327

(51) Int. Cl.
 *H02B 11/133* (2006.01)
 *H02B 13/025* (2006.01)
 *H02H 7/22* (2006.01)

(52) U.S. Cl.
 CPC ......... *H02B 11/133* (2013.01); *H02B 13/025* (2013.01); *H02H 7/22* (2013.01)

(58) Field of Classification Search
 CPC ...... H02B 11/133; H02B 13/025; H02H 7/22; H02P 29/02; H02P 29/024;
 (Continued)

(56) References Cited

U.S. PATENT DOCUMENTS 10,103,535 B2 * 10/2018 Baumann ............... H02H 3/006
10,424,444 B2 * 9/2019 Yang ................... G01R 31/3272
(Continued)

FOREIGN PATENT DOCUMENTS

JP 5787231 B2 9/2015

OTHER PUBLICATIONS

French Search Report and Written Opinion dated Jan. 27, 2022 for corresponding French Patent Application No. FR2105327, 12 pages.

*Primary Examiner* — Giovanni Astacio-Oquendo
(74) *Attorney, Agent, or Firm* — Locke Lord LLP (57) ABSTRACT

A method for monitoring switchgear, provided with a switching mechanism, including:
 monitoring an electric power supply signal to an electromagnetic actuator of the switching mechanism in order to detect the start of the supply of electric power to the actuator,
 monitoring an impact intensity measurement in the switchgear in order to detect the setting in motion of the switching mechanism,
 monitoring a parameter representative of the open or closed state of the switchgear in order to detect a change in state of the parameter, representative of an end of an opening or closing sequence of the switchgear.
The method further includes:
 calculating a time $T_{ACT}$ that has elapsed between the detection of the start of the supply of electric power to the actuator and the detection of the setting in motion of the switching mechanism of the switchgear,
 calculating a time $T_M$ that has elapsed between the setting in motion of the switching mechanism and the sequence end.

17 Claims, 5 Drawing Sheets

(58) Field of Classification Search
CPC ...... H02P 29/0241; H02P 29/027; H02P 3/06; G01R 31/3277; G01R 31/3275
USPC .................................... 324/415, 422, 424
See application file for complete search history.

(56) References Cited

U.S. PATENT DOCUMENTS

| | | | |
|---|---|---|---|
| 10,916,929 B2* | 2/2021 | Kopaczewski | .... G01R 31/3275 |
| 2020/0003838 A1* | 1/2020 | Robertson | .......... G01R 31/3277 |
| 2022/0278520 A1* | 9/2022 | Boury | ...................... H02H 3/05 |
| 2023/0258667 A1* | 8/2023 | Berberich | ............ G01R 31/343 |
| | | | 702/34 |

* cited by examiner

METHOD AND DEVICE FOR MONITORING SWITCHGEARS

TECHNICAL FIELD

The invention relates to the field of monitoring the operation of switchgear such as low-voltage circuit breakers, that is to say up to 1000 volts in general, or medium-voltage circuit breakers, for example between 1000 volts and 25 000 volts.

This switchgear comprises a switching mechanism provided with a device for arming a return spring of the switching mechanism, which makes it possible to switch switching units, such as contacts, between a closed position, in which a current flows through the switchgear, and an open position, in which the current is interrupted by the switchgear. To perform the switching, an electromagnetic actuator releases the spring, which returns the switching mechanism to the open position of the switchgear. It is desirable to be able to monitor the correct operation both of the electromagnetic actuator and of the switching mechanism.

PRIOR ART

It is known to equip such switchgear with auxiliary contacts for detecting the position of the switching units, along with current or voltage sensors for detecting the start of movement of the switching mechanism. These auxiliary contacts and these sensors make it possible to determine a start of an opening sequence or an end of an opening sequence of the switchgear based on a change in state of the auxiliary contacts, but do not make it possible to measure the time needed for the electromagnetic actuator of the switchgear to initiate the setting in motion of the switching mechanism. In addition, it is also not possible, with these auxiliary contacts or switches, to measure the time needed for this switching mechanism to actually disconnect or re-establish the circuit.

Technical Problem

Knowing how to distinguish the time needed for the electromagnetic actuator to initiate the setting in motion of the switching mechanism in order to actually open or close the electrical circuit is useful in the context of switchgear maintenance. Specifically, an increased time to initiate the setting in motion of the switching mechanism may correspond to a minor fault of the switchgear without any impact on the quality of the actual switching, while an excessively slow switching mechanism may lead to a switching fault of the circuit controlled by the switchgear.

SUMMARY OF THE INVENTION

To this end, the present application proposes a method for monitoring switchgear, provided with a switching mechanism, comprising:
- a.—monitoring an electric power supply signal to an electromagnetic actuator of the switching mechanism in order to detect the start of the supply of electric power to said actuator,
- b.—monitoring an impact intensity measurement in said switchgear in order to detect the setting in motion of said switching mechanism,
- c.—monitoring a parameter representative of the open or closed state of said switchgear in order to detect a change in state of said parameter, representative of an end of an opening or closing sequence of said switchgear, and comprising:
- d.—calculating a time $T_{ACT}$ that has elapsed between the detection of the start of the supply of electric power to said actuator and the detection of the setting in motion of the switching mechanism of said switchgear,
- e.—calculating a time $T_M$ that has elapsed between said setting in motion of the switching mechanism and said sequence end.

The method is thus based directly on the monitoring of electrical and physical parameters that are linked directly to the times of setting in motion of the switching mechanism and of the electromagnetic actuator, thereby allowing these times to be measured precisely.

The method may advantageously comprise comparing said electric power supply signal with a threshold S1 representative of a start of the supply of electric power to said actuator.

The method may advantageously comprise comparing said impact intensity with a threshold C1 representative of the setting in motion of a switching mechanism of said circuit breaker.

The electric power supply signal may be a supply current $I_{ACT}$ to the electromagnetic actuator.

In one alternative embodiment, the electric power supply signal may be a supply voltage to the electromagnetic actuator.

Advantageously, the impact intensity measurement is performed by way of a vibration sensor that supplies a vibratory signal in response to the setting in motion of said switching mechanism.

The parameter representative of the open or closed state of said switchgear may be a logic state SW of an auxiliary contact of the switching mechanism of the switchgear.

According to one advantageous embodiment, the method comprises comparing said elapsed times $T_{ACT}$ and $T_M$ with predetermined threshold values, respectively $TS_{ACT}$ and $TS_M$, with a view to performing diagnostics on the operation of the switchgear.

The method may comprise an electromagnetic actuator fault alert when the time $T_{ACT}$ is greater than the threshold value $TS_{ACT}$.

The method may comprise a switching mechanism fault alert when the time $T_M$ is greater than the threshold value $TS_M$.

The method may comprise analysing the waveform of the electric power supply signal to the electromagnetic actuator.

This allows the operation of the electromagnetic actuator to be monitored.

The invention furthermore relates to a device for monitoring the operation of switchgear, which comprises:
- a. a measuring interface provided with means for reading signals on connecting links connecting units of said switchgear to a control device for controlling said switchgear, comprising:
  - i. at least one current or voltage sensor on one of said links, corresponding to a power supply path to an electromagnetic actuator of the switching mechanism of the switchgear,
  - ii. at least one voltage sensor on one of said links, corresponding to an auxiliary open or closed position contact of the switchgear, called auxiliary switchgear contact, b. at least one impact sensor configured so as to detect the setting in action of the switching mechanism of the switchgear, c. a signal acquisition and calculating unit connected to said signal reading means and to the impact sensor and provided with an acquisition module for acquiring said signals, a processor connected to said acquisition module and a memory containing a set of instructions for implementing the method according to the invention when said instructions are executed by said processor.

The monitoring device is easy to implement and does not interfere with the operation of the switchgear.

According to one advantageous embodiment, said interface comprises a first connector, complementary to a connection receptacle for a connecting plug for connecting said switchgear to a control device for controlling said switchgear, and a second connector adopting the configuration of said receptacle and grouping together said signal reading means, between said first connector and second connector, said electronic circuit comprising point-to-point links between the connection points facing said first and second connectors.

This allows fast fitting of already installed switchgear without the need to modify the harness to which it is connected.

According to one advantageous embodiment, the monitoring device comprises a power supply implemented by way of a tap connected to a power supply link to a sensor of the switchgear.

It is thus not necessary to implement any additional wiring for supplying power to the device.

The signal acquisition and calculating unit advantageously comprises a communication device for wireless or wired communication with a hub for driving and monitoring said switchgear and designed to transmit, to said hub, monitoring data and operating parameters of said switchgear that are generated by said signal acquisition and calculating unit from measurements performed by way of said sensors.

The signal acquisition and calculating unit thus performs the measurements and the calculations required to detect faults on the switchgear or its control system locally, and transmits the results to the hub, which manages a plurality of items of switchgear.

The impact sensor may be arranged in a housing of the signal acquisition and calculating unit. According to this embodiment, this housing is fixed directly to the switchgear.

As an alternative, the impact sensor may be arranged on the switchgear and connected to the signal acquisition and calculating unit by a wired link.

The invention also relates to a computer program comprising instructions for implementing all or part of the method of the invention when this program is executed by a processor.

BRIEF DESCRIPTION OF THE DRAWINGS

Other features, details and advantages of the invention will become apparent upon reading the detailed description below of non-limiting exemplary embodiments and upon analysing the appended drawings, in which.

DESCRIPTION OF THE EMBODIMENTS

The drawings and the description below contain elements that may not only serve to better elucidate the present invention, but also contribute to the definition thereof, where appropriate.

Figure 1:
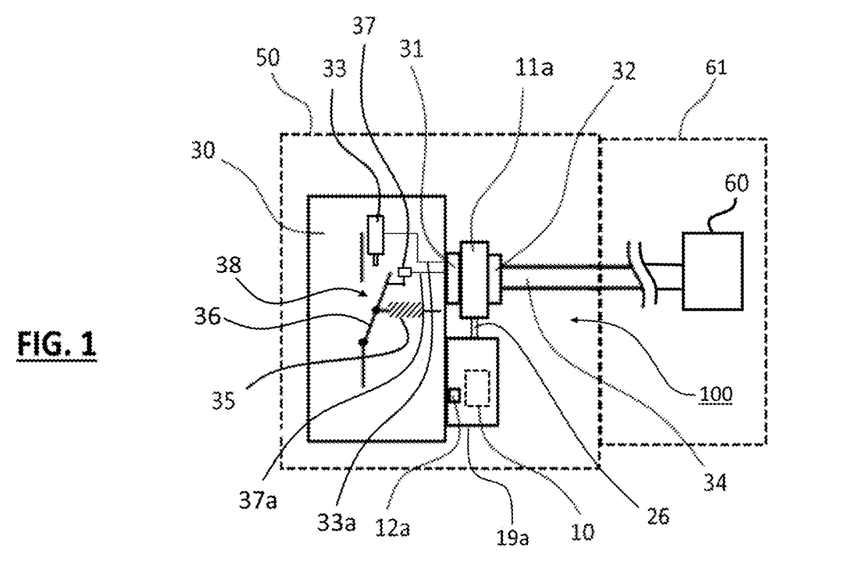
FIG. 1 shows a schematic depiction of a device according to a first exemplary embodiment.

FIG. 1 schematically shows a control device 60, for example arranged in an enclosure 61, electrically connected to switchgear 30. The switchgear 30, for example arranged in an electrical enclosure 50, is configured so as to open or close an electrical circuit, not shown, through a switching unit 36.

The control device 60 is configured so as to control the switchgear 30 by supplying power to an electromagnetic actuator 33. The electromagnetic actuator 33 drives a switching mechanism 38, which makes it possible to alternately implement an open state or a closed state of the switching unit 36 of the switchgear 30. In a manner known per se, when switchgear 30 has to open or close the electrical circuit, the control device 60, through a link 33a, supplies power to the electromagnetic actuator 33 of the switchgear 30, which releases a spring 35 of the switching mechanism 38 so as to open or close, where appropriate, the switching member 36. In order to achieve switching, there is therefore a duration for which the magnetic actuator 33 is controlled so as to release the spring 35 of the switching mechanism 38, and then an actuation duration for which the switching mechanism moves the switching member from the closed to the open position or vice versa. These two durations, specifically the control duration and the actuation duration, together correspond to the duration of setting in motion of the switching mechanism 38.

The switchgear 30 is connected to the control device 60 by a connecting harness 34 through which a power supply to the electromagnetic actuator 33 travels.

The invention proposes to use signals travelling through the connecting harness 34 and an impact detection to analyse the operation of the switching mechanism 38 driven by the electromagnetic actuator 33.

According to FIG. 1, the switchgear 30 comprises an auxiliary contact 37 for detecting the open or closed position of the switching member 36, connected to the control device 60 via the connecting harness 34. The connecting harness 34 may also comprise one or more power supply links for one or more sensors, not shown.

Figure 3:
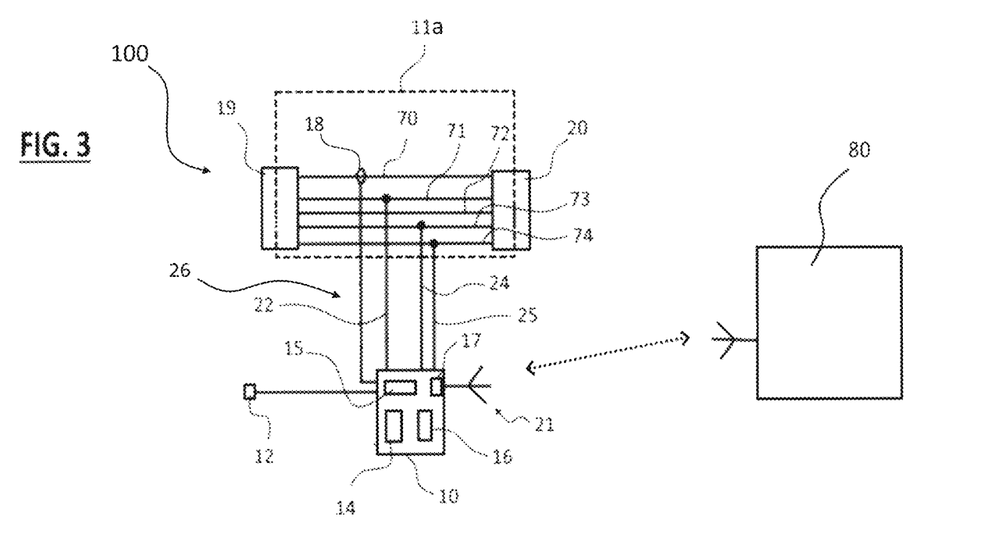
FIG. 3 shows a schematic depiction of the connection of a monitoring device suitable for the invention.

FIG. 3 schematically shows one exemplary embodiment of a monitoring device 100, which comprises a measuring interface 11a provided with means for reading signals on connecting links 70, 71, 72, 73, 74 connecting the switchgear 30 to the control device 60. More precisely, in this exemplary embodiment, the measuring interface 11a comprises the first connector 19, complementary to the receptacle 31, and the second connector 20, complementary to the plug 32. The measuring interface comprises point-to-point links 70, 71, 72, 73, 74 between connection points facing said first and second connectors. The measuring interface 11a furthermore groups together said means for reading signals that are transmitted to the signal acquisition and calculating unit 10 by way of a harness 26.

The signal acquisition and calculating unit 10 is provided with an acquisition module 15 for acquiring said signals between an input for the sensor 12 and a processor 14 connected to said acquisition module and a memory 16 possibly comprising read-only memory, containing the instructions of the method, and random access memory, in a manner known per se.

The monitoring device 100 is designed to be arranged between the switchgear and the control device, in particular electrically connected to the switchgear and to the control device by a first connector 19 and a second connector 20, respectively.

The signals used in the context of the invention are an electric power supply signal, in particular voltage or current supply signal, to the electromagnetic actuator 33, a signal representative of the open or closed state of the switchgear, coming from the auxiliary contact 37 of the switchgear 30, and a signal from an impact intensity measurement coming from an impact sensor 12.

If the power supply signal is a signal representative of a current measurement, the monitoring device 100 shown schematically in FIG. 3 comprises a current sensor 18, for example a Hall effect sensor or a Rogowski coil on the link 70 corresponding to a power supply path to the electromagnetic actuator of the switchgear. Such a current measurement has the advantage of taking place on a single power supply wire, of not risking interfering with the supply of power to the electromagnetic actuator nor of risking overvoltages at the monitoring device 100. If the power supply signal is a signal representative of a voltage measurement, the measurement may be performed by way of a tap on said power supply path, but in this case it is preferable to perform the measurement between the outward and return wires of the supply of power to the electromagnetic actuator.

A voltage sensor 22, such as a tap on the link 71, is designed to detect a change in open or closed state of the switchgear.

An impact sensor 12 is arranged on the switchgear and is configured so as to measure an impact intensity corresponding to the setting in motion of the switching mechanism 38 of the switchgear.

The monitoring device 100 comprises a signal acquisition and calculating unit 10 connected to said means for reading signals and to the impact sensor.

The monitoring device 100 may have multiple configurations and, in a first embodiment according to FIG. 1, the measuring interface 11a and the signal acquisition and calculating unit 10 of the monitoring device are, as in FIG. 3, separate and connected by a wiring harness 26 through which the measured signals travel.

The interface 11a is arranged between a receptacle 31 of the switchgear and a plug 32.

In this configuration, the signal acquisition and calculating unit is housed in a housing 19a fixed to the switchgear 30 and the impact sensor 12a is integrated into said housing 19a, which is arranged in contact with the switchgear.

Figure 2:
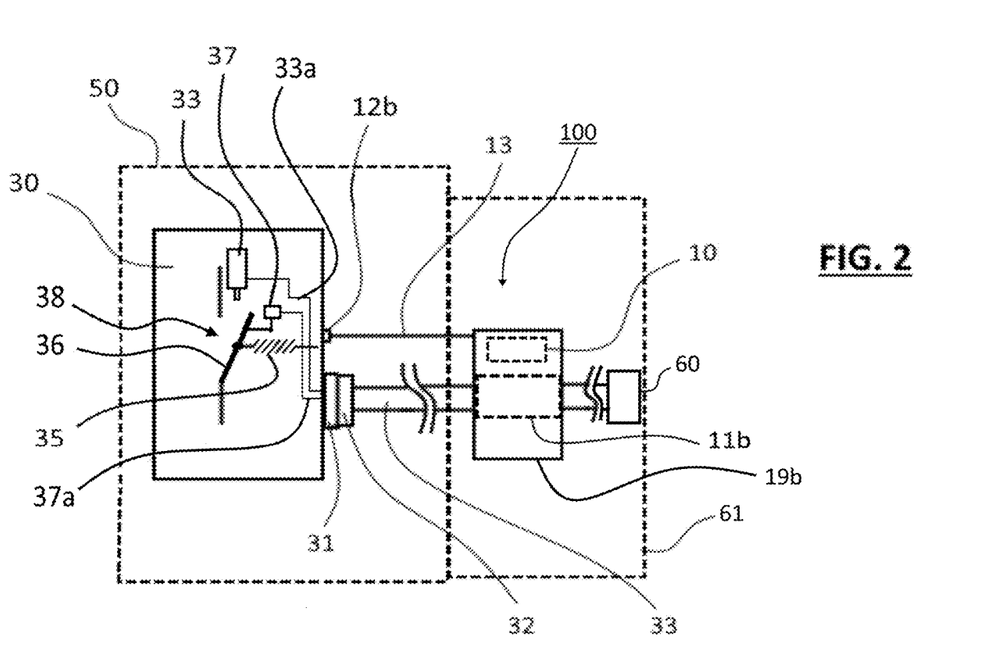
FIG. 2 shows a schematic depiction of a device according to a second exemplary embodiment.

A second exemplary embodiment is described in FIG. 2. In this example, the monitoring device 100 is for example transferred into the enclosure 61 housing the control device 60 and is connected to a harness 33 that connects the control device to the switchgear. The monitoring device comprises a linking interface 11b integrated into a housing 19b that encloses the signal acquisition and calculating unit 10. The linking interface 11b is connected, within the housing 19a, to the signal acquisition and calculating unit 10.

Figure 4:
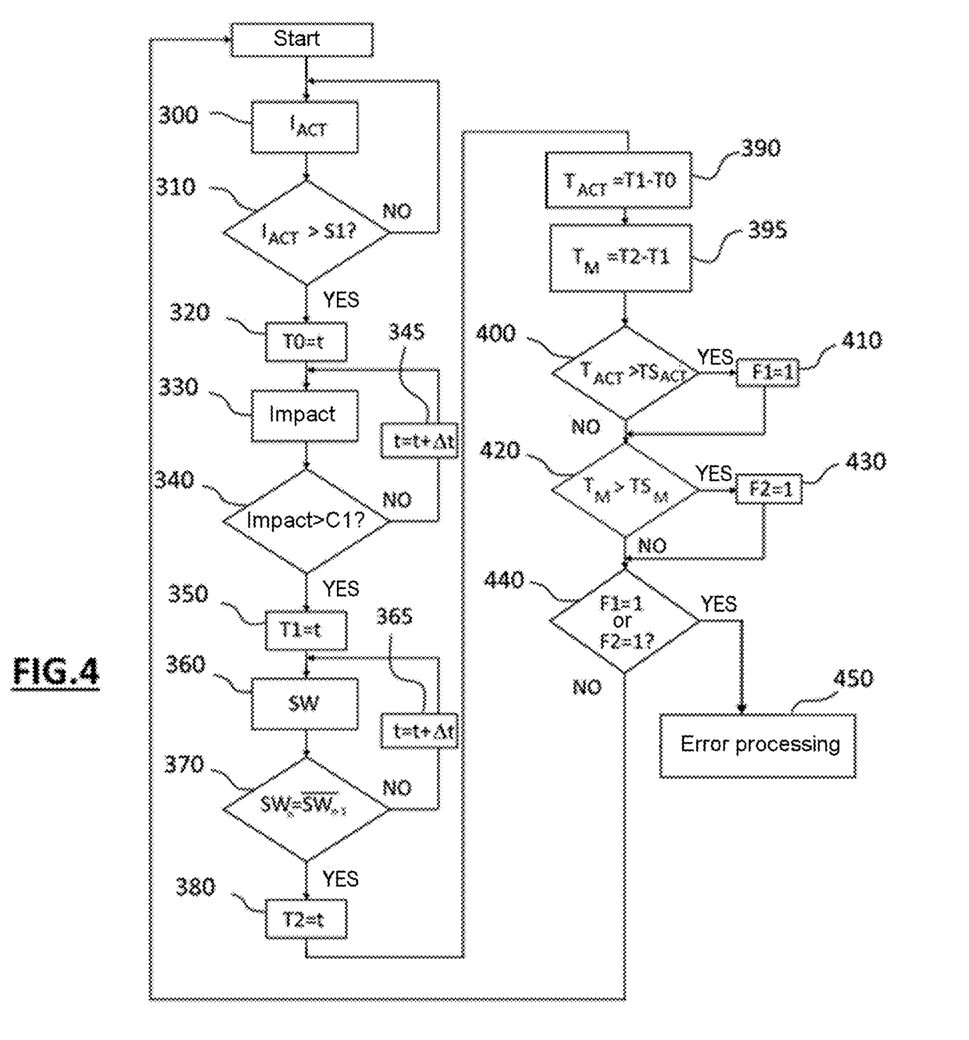
FIG. 4 shows a flowchart of steps of the invention.

FIG. 4 shows a flowchart comprising steps of a method for monitoring the switchgear 30. This method may be integrated into a more global method for monitoring a plurality of items of switchgear that are managed at a low-voltage or medium-voltage control station, for example.

The method comprises monitoring 300 an electric power supply signal, here a control current $I_{ACT}$ to the electromagnetic actuator 33, in order to detect the start of the supply of electric power to said electromagnetic actuator 33. This monitoring may be performed within the signal acquisition and calculating unit 10. This monitoring is repeated for as long as the current $I_{ACT}$ does not exceed a threshold value S1 in step 310, the measurement is repeated.

If the current $I_{ACT}$ has exceeded the threshold value S1, the method comprises a step of storing the time value T0 of the time at which the current exceeded the threshold value S1 in step 320.

The method then comprises monitoring an impact intensity 330 by way of a measurement by the vibration sensor 12. The measurement may be a measurement of the intensity of vibrations at said switchgear, making it possible to detect the setting in motion of said switching mechanism. For as long as the impact intensity measurement remains below a threshold C1 in step 340, the monitoring continues and a time counter t is incremented in step 345.

When the impact intensity measurement exceeds the threshold C1, the time value T1 is stored in step 350.

The method then comprises, in step 360, monitoring a parameter SW representative of the opening or of the closure of said switchgear, for example a logic state representative of the open or closed state of the switching unit. The method detects, in step 370, a change in state of said parameter SW, this being representative in this case of an end of an opening or closing sequence of said switchgear.

For as long as the change in state is not detected, the time counter increments in step 365.

Once the auxiliary contact has been activated, the time T2 representative of the end of the opening or closing sequence is stored.

The method then comprises calculating 390 a time $T_{ACT}$ that has elapsed between the detection of the start of the supply of electric power to said actuator and the detection of the setting in motion of the switching mechanism. The method also comprises calculating 395 a time $T_M$ that has elapsed between said setting in motion of the switching mechanism and said sequence end.

Next, the monitoring method may comprise comparing, in steps 400, 420, said elapsed times $T_{ACT}$ and $T_M$ with predetermined threshold values, respectively $TS_{ACT}$ and $TS_M$, with a view to performing diagnostics on the operation of the switchgear. These steps may be performed within the signal acquisition and calculating unit 10, but may also be performed in a computer (not shown) of the control device 60 for controlling the switchgear or a hub 80 of a local or remote control station to which the signal acquisition and calculating unit is connected, either in a wired manner, such as an Ethernet link, or in a wireless manner 21, such as a Wi-Fi, Zigbee, Bluetooth link or the like.

When the time $T_{ACT}$ is greater than the threshold value $TS_{ACT}$ predefined depending on the type of switchgear, an electromagnetic actuator fault alert 410 is issued for example by way of a logic flag F1 initialized in step 410 when $T_{ACT}$ is greater than $TS_{ACT}$ in step 400. Such an alert may generate a request to intervene in a maintenance operation.

When the time $T_M$ is greater than the threshold value $TS_M$, a switching mechanism fault alert 430 is generated, for example by way of a logic flag F2 initialized in step 430 when $T_M$ is greater than $TS_M$ in step 420 and, depending on the chosen threshold $TS_M$, an urgent intervention request may be generated due to the fact that an excessively long actuation time of the switching mechanism may lead to the switching not taking place and cause a serious malfunction with the switchgear.

The method thus makes it possible to diagnose the switching function of the switchgear.

Figure 5:
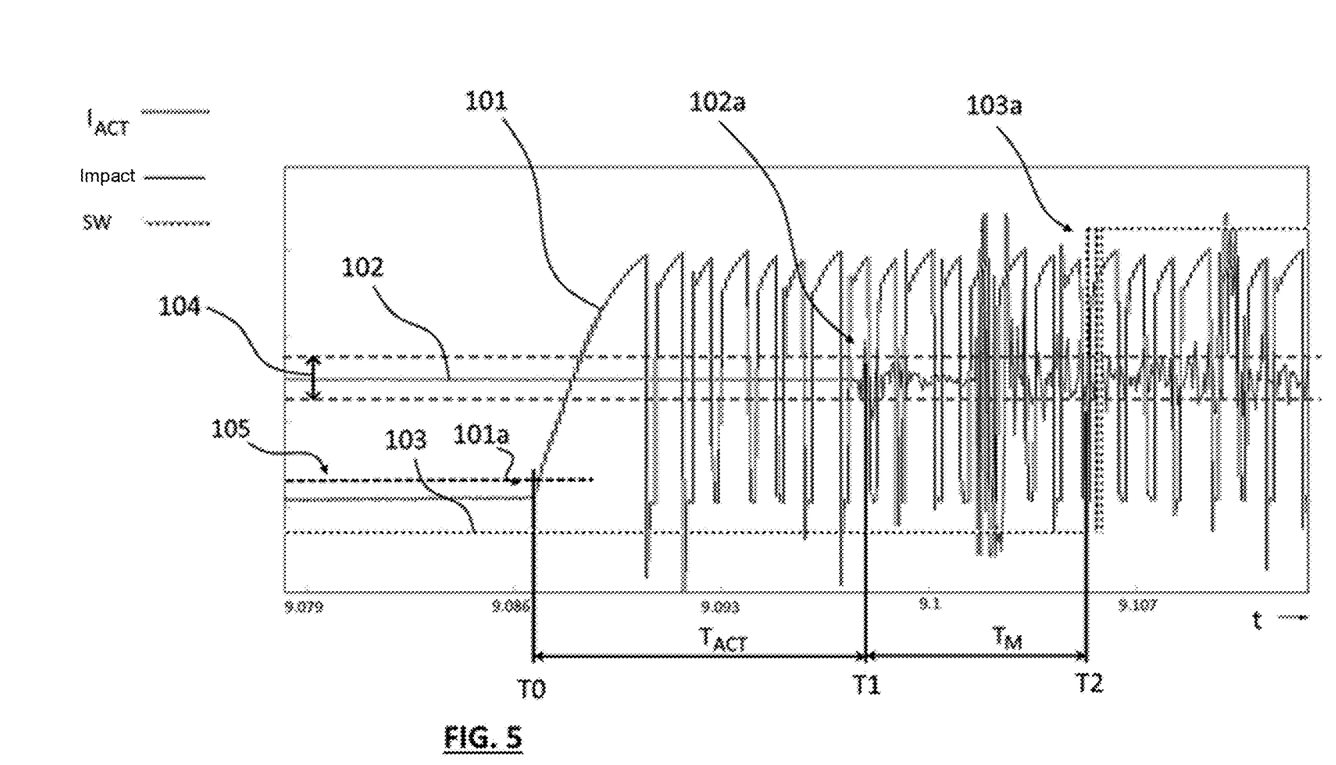
FIG. 5 shows a depiction of signals used in the context of the invention for a first type of electromagnetic actuator.
Figure 6:
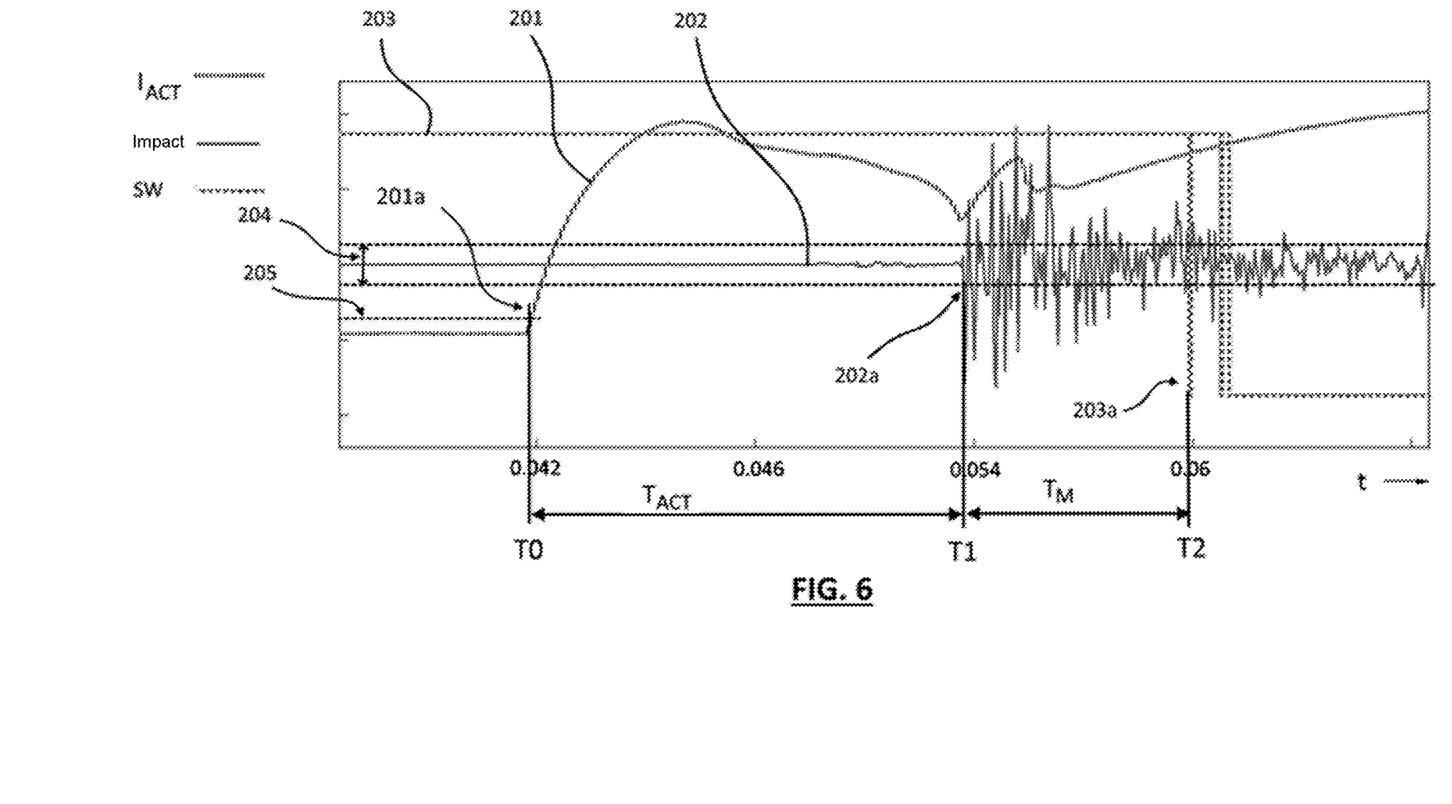
FIG. 6 shows a depiction of signals used in the context of the invention for a second type of electromagnetic actuator.

FIGS. 5 and 6 illustrate types of signal used in the context of the method.

FIG. 5 corresponds to a monitoring device in which the electromagnetic actuator comprises a coil driven using pulse width modulation (PWM). In particular, FIG. 5 shows the signals scaled so as to fit on the same graph showing the times $T_{ACT}$ time of setting into operation of the actuator and $T_M$ time of movement of the switching mechanism. What is thus illustrated is the current $I_{ACT}$ 101 with the detection of the start of supply of power 101a according to the threshold S1 105, the vibratory signal Impact 102 according to the threshold C1 104 and a value 102a representative of the intensity of the impact of setting into motion of the switching mechanism and the logic signal 103 from the auxiliary contact that will give the parameter representative of the open or closed state of the switchgear and the detection 103a of the change in state of this auxiliary contact by the changing of the logic value 0 to 1.

FIG. 6 corresponds to an electromagnetic actuator whose coil is driven by a similar current and represents the signals scaled so as to fit on the same graph showing the times $T_{ACT}$ time of setting into operation of the actuator and $T_M$ time of movement of the mechanism and comprising the coil current $I_{ACT}$ 201 with the detection of the start of supply of power 201a according to the threshold S1 205, the vibratory signal Impact 202 with a threshold range C1 204 and a value 102a representative of the impact of start of movement of the switching mechanism and the logic signal 203 from the auxiliary contact, here inverted, and the detection 203a of the change in state of the auxiliary contact by the changing of the logic value 1 to 0.

The monitoring of the signals of the present invention may also comprise analysing the waveform of the electric power supply signal 101, 201 to the electromagnetic actuator, i.e. obtaining the representation of the amplitude and phase of a wave either mathematically or by electronic instrument, in order to monitor the features thereof, such as its peak or average value.

The invention applies more particularly to low-voltage and medium-voltage switchgear for power supply control stations, such as power supply control stations on premises and of industrial machines.

The invention is not limited to the examples described above, only by way of example, but incorporates all variants that might be envisaged by a person skilled in the art within the scope of the desired protection, and in particular as stated above, the electric power supply signal to the actuator may be a supply voltage to the electromagnetic actuator 33 rather than its supply current, and the method associated with the device may comprise monitoring other operating parameters of the switchgear depending on the wiring of the interface 11a or 11b.

The invention claimed is:

1. A method for a device for monitoring operation of a switchgear, provided with a switching mechanism, the device comprising:
   a. a measuring interface provided with sensors for reading signals on connecting links that connect units of said switchgear to a control device for controlling said switchgear, the sensors for reading signals comprising:
      i. at least one current or voltage sensor on one of said connecting links, corresponding to a power supply path to an electromagnetic actuator of the switching mechanism of the switchgear, and
      ii. at least one voltage sensor on one of said connecting links, corresponding to an auxiliary contact of the switchgear,
   b. at least one impact sensor configured so as to detect a setting in motion of the switching mechanism of the switchgear, and
   c. a signal acquisition and calculating unit connected to said sensors for reading signals and to the at least one impact sensor and provided with an acquisition module for acquiring said signals, a processor connected to said acquisition module and a memory containing a set of instructions executed by said processor, wherein the method comprises:
   monitoring, by the processor of the device, an electric power supply signal to the electromagnetic actuator of the switching mechanism in order to detect a start of a supply of electric power to said electromagnetic actuator,
   monitoring, by the processor of the device, an impact intensity measurement in said switchgear in order to detect the setting in motion of said switching mechanism,
   monitoring, by the processor of the device, a parameter representative of an open or closed state of said switchgear in order to detect a change in state of said parameter, representative of an end of an opening sequence of said switchgear,
   calculating, by the processor of the device, a time $T_{ACT}$ that has elapsed between the detection of the start of the supply of electric power to said actuator and the detection of the setting in motion of the switching mechanism of said switchgear, and
   calculating, by the processor of the device, a time $T_M$ that has elapsed between said setting in motion of the switching mechanism and the end of said opening sequence end of said switchgear.

2. The method for monitoring switchgear according to claim 1, comprising comparing said electric power supply signal with a threshold S1 representative of the start of the supply of electric power to said electromagnetic actuator.

3. The method for monitoring switchgear according to claim 1, comprising comparing said impact intensity measurement with a threshold C1 representative of the setting in motion of said switching mechanism.

4. The method for monitoring switchgear according to claim 1 wherein the electric power supply signal is a supply current $I_{ACT}$ to the electromagnetic actuator.

5. The method for monitoring switchgear according to claim 1 wherein the electric power supply signal is a supply voltage to the electromagnetic actuator.

6. The method for monitoring switchgear according to claim 1, wherein the impact intensity measurement is performed by way of a vibration sensor that supplies a vibratory signal in response to the setting in motion of said switching mechanism.

7. The method for monitoring switchgear according to claim 1, wherein the parameter representative of the open or closed state of said switchgear is a logic state SW of an auxiliary contact of the switching mechanism.

8. The method for monitoring switchgear according to claim 1, comprising comparing said elapsed times $T_{ACT}$ and $T_M$ with predetermined threshold values, respectively $TS_{ACT}$ and $T_{SM}$, with a view to performing diagnostics on an operation of the switchgear.

9. The method for monitoring switchgear according to claim 8, comprising generating an electromagnetic actuator fault alert when the time $T_{ACT}$ is greater than the threshold value $TS_{ACT}$.

10. The method for monitoring switchgear according to claim 8, comprising generating a switching mechanism fault alert when the time $T_M$ is greater than the threshold value $T_{SM}$.

11. The method for monitoring switchgear according to claim 1, comprising analysing a waveform of the electric power supply signal to the electromagnetic actuator.

12. A computer program product comprising a non-transitory computer readable medium having processor executable instructions stored thereon for implementing the method according to claim 1 when the instructions are executed by the processor of the device for monitoring operation of switchgear.

13. A device for monitoring operation of a switchgear, comprising:
   a. a measuring interface provided with sensors for reading signals on connecting links that connect units of said switchgear to a control device for controlling said switchgear, the sensors for reading signals comprising:
      i. at least one current or voltage sensor on one of said connecting links, corresponding to a power supply path to an electromagnetic actuator of the switching mechanism of the switchgear, and
      ii. at least one voltage sensor on one of said connecting links, corresponding to an auxiliary contact of the switchgear,
   b. at least one impact sensor configured so as to detect a setting in motion of the switching mechanism of the switchgear, and
   c. a signal acquisition and calculating unit connected to said sensors for reading signals and to the at least one impact sensor and provided with an acquisition module for acquiring said signals, a processor connected to said acquisition module and a memory containing a set of instructions, which when executed by said processor, cause the processor to perform:
   monitoring an electric power supply signal to the electromagnetic actuator of the switching mechanism in order to detect a start of a supply of electric power to said electromagnetic actuator,
   monitoring an impact intensity measurement in said switchgear in order to detect the setting in motion of said switching mechanism,
   monitoring a parameter representative of an open or closed state of said switchgear in order to detect a change in state of said parameter, representative of an end of an opening sequence of said switchgear,
   calculating a time $T_{ACT}$ that has elapsed between the detection of the start of the supply of electric power to said actuator and the detection of the setting in motion of the switching mechanism of said switchgear, and
   calculating a time $T_M$ that has elapsed between said setting in motion of the switching mechanism and the end of said opening sequence of said switchgear.

14. The monitoring device according to claim 13, wherein said measuring interface comprises a first connector, complementary to a connection receptacle for a connecting plug for connecting said switchgear to the control device for controlling said switchgear, and a second connector adopting a configuration of said connection receptacle and grouping together said sensors for reading signals, between said first connector and second connector, said connecting links comprising point-to-point links between the connection points facing said first and second connectors.

15. The monitoring device according to claim 13, comprising a power supply implemented by way of a tap, connected to a power supply link to a sensor of the at least one current or voltage sensor, said at least one voltage sensor and said at least one impact sensor of the switchgear.

16. The monitoring device according to claim 13, wherein the signal acquisition and calculating unit comprises a communication device for wireless or wired communication with a hub for driving and monitoring said switchgear and designed to transmit, to said hub, monitoring data and operating parameters of said switchgear that are generated by said signal acquisition and calculating unit from measurements performed by way of said at least one current or voltage sensor, said at least one voltage sensor and said at least one impact sensor.

17. The monitoring device according to claim 13 wherein said at least one impact sensor is arranged in a housing of the signal acquisition and calculating unit or arranged on the switchgear and connected to the signal acquisition and calculating unit by a wired link.

* * * * *